United States Patent
Felegi, Jr. et al.

(10) Patent No.: US 7,033,963 B2
(45) Date of Patent: Apr. 25, 2006

(54) ACOUSTICAL PANEL COATING AND PROCESS OF APPLYING SAME

(75) Inventors: John Felegi, Jr., Lancaster, PA (US); James D. Pape, Columbia, PA (US); John J. Hartman, Jr., Millersville, PA (US); Scott L. Huntzinger, Lancaster, PA (US); Suzanne M. Huntzinger, Lancaster, PA (US); JoAnne LeFever, Lancaster, PA (US); Michael J. Hermesky, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/668,924

(22) Filed: Sep. 23, 2003

(65) Prior Publication Data
US 2004/0062898 A1   Apr. 1, 2004

Related U.S. Application Data

(60) Provisional application No. 60/414,950, filed on Sep. 30, 2002.

(51) Int. Cl.
*B32B 5/16* (2006.01)

(52) U.S. Cl. ............... 442/44; 442/43; 442/58; 428/45; 428/48; 181/286; 181/291; 181/294

(58) Field of Classification Search ............ 442/43, 442/44, 58; 428/48, 45; 181/286, 291, 294
See application file for complete search history.

(56) References Cited

U.S. PATENT DOCUMENTS

| 4,039,492 A | 8/1977 | Hamilton | 260/8 |
| 5,674,594 A | 10/1997 | Sensenig | 428/206 |
| 5,869,166 A | 2/1999 | Caldwell | 428/142 |

FOREIGN PATENT DOCUMENTS

| EP | 0 761 776 A2 | 3/1997 |
| EP | 0 950 646 A1 | 10/1999 |
| EP | 1 079 036 A2 | 2/2001 |

*Primary Examiner*—Alexander S. Thomas (57) ABSTRACT

A coating composition and process of applying the coating to a substrate are provided herein. The coating composition includes filler particles, binder and a liquid carrier, such as water. The filler particles have an average particle size in the range from about 100 to about 600 microns and preferably in the range from about 200 to about 450 microns. The coating composition comprises from about 15% to about 50% by weight liquid carrier and from about 35% to about 90% by dry solids weight filler particles. The coating composition preserves the acoustic performance characteristics of the substrate to which it is applied, while imparting a textured appearance to the substrate, making the substrate virtually indistinguishable from surrounding panels.

11 Claims, 4 Drawing Sheets

ACOUSTICAL PANEL COATING AND PROCESS OF APPLYING SAME

CROSS REFERENCE TO RELATED APPLICATION

This application claims the benefit under 35 U.S.C. §119 (e) of U.S. provisional application Ser. No. 60/414,950, filed Sep. 30, 2002.

BACKGROUND

The present invention relates generally to ceiling systems having acoustical panels and more particularly to coatings for acoustic scrims of flat panel sound radiators and acoustical panels and a method for applying these coatings.

As the service sector of the economy grows, more and more workers find themselves in offices rather than in manufacturing facilities. The need for flexible, reconfigurable space has resulted in open plan workspaces, large rooms with reduced height, moveable partitions, and suspended ceiling systems. Workstation density also is increasing, with more workers occupying a given physical space. Additionally, speakerphones, conferencing technologies, and multimedia computers with large sound reflecting screens and voice input tend to increase the noise level of the workplace.

In response to increased noise within the workplace, suspended ceilings having acoustical ceiling panels have been developed to absorb and abate extraneous noise within a confined space. The modular design of such panels allows for ease of installation and ease in office space reconfiguration. Building planners often specify modular acoustical panels as a standard system within their designs. Acoustical panels can both enhance the work environment by providing acoustic sound absorption and attenuation and by providing a pleasant monolithic visual appearance. Thus, there has been an increased emphasis on specifying suspended ceiling systems with high acoustic absorptions and pleasant visual appearances.

Building planners prefer to utilize ceiling systems that are substantially monolithic in structure and design. Such ceiling systems provide a pleasant visual appearance to persons viewing the ceiling from below. Loudspeakers often are required in office spaces where ceilings are formed of acoustical panels in a suspended ceiling grid. Loudspeakers are used to provide sound in a workspace such as paging messages, music, and background masking sounds. The background masking sounds reduce the effect of unwanted noise from infrastructure systems such as ventilation systems and which mask speech noise allowing for greater speech privacy. Unfortunately, many loudspeaker systems do not integrate visually into the ceiling system and, as a result, interrupt the desired monolithic appearance of the ceiling.

By way of example, many speaker systems, when installed, protrude below the plane of the acoustical panels, thus interrupting the planar surface of ceiling. Some speaker systems can be installed by cutting a hole in a acoustical panel and installing a speaker with a round perforated grill within the opening. Such a speaker grill, while effective, nevertheless interrupts the monolithic appearance of the ceiling and is considered unsightly by some.

More recently, flat panel sound radiators are being utilized in place of these traditional loudspeakers. The flat panel radiators are more visually pleasing than traditional loudspeakers because they are co-extensive with the plane of the ceiling and have the size and look of ceiling panels. However, existing flat panel sound radiators generally are detectable because the coloring and texture of the facing does not match precisely the surrounding ceiling tiles. Thus, these flat panel radiators still are considered by some to present an unacceptable appearance.

Attempts have been made to develop coatings to be applied to the facings of flat panel sound radiators so as to render the facings similar in appearance and texture to surrounding acoustical panels. However, it has proven difficult to formulate a coating and a process for its application which provides the facing material with the proper appearance and texture while continuing to provide the desired acoustic transparency. These requirements heretofore have seemed to be somewhat mutually exclusive conditions.

SUMMARY

The present invention provides a coating composition which, when applied to a substrate, such as an acoustical panel, scrim or facing of a flat panel sound radiator, preserves the acoustical performance characteristics of the substrate and imparts a textured appearance to the substrate making it visually indistinguishable from surrounding panels in a wall or suspended ceiling system. Thus, a monolithic appearance in the wall or ceiling system is achieved.

Briefly described, the coating composition comprises filler particles, a binder and a liquid carrier, such as water. The filler particles have an average particle size in the range from about 100 to about 600 microns and preferably in the range from about 200 to about 450 microns. The coating composition comprises from about 15% to about 50% by weight liquid carrier and from about 35% to about 90% by dry solids weight filler particles.

The present invention also provides a method for applying a coating composition to a substrate. The method includes providing a coating composition containing filler particles, a binder and a liquid carrier; applying the coating composition to a substrate using a high volume, low pressure (HVLP) spray apparatus; and drying the coated substrate. The resulting coated substrate has an airflow resistance in the range from about 600 mks rayls to 900 mks rayls and a texture value in the range from about 20 ml/sq ft to about 65 ml/sq ft.

The present invention also is directed to a coated scrim that exhibits an airflow resistance value of about 900 mks rayls or less and a texture value of about 20 ml/sq ft or greater. The coated scrim also has a hiding power value of at least 98%. The coated scrim may be used in conjunction with acoustical panels, flat panel sound radiators, walls, furniture, cubicle partitions, HVAC systems or other structures in which acoustical transparency and a textured appearance is desired. The coated scrim includes a woven or non-woven porous material such as non-woven fiberglass, and the coating composition of the invention.

An acoustical panel exhibiting a textured appearance also is encompassed by the present invention. The acoustical panel includes a substrate, such as wood and mineral fiberboard, and the coating composition of the invention. The substrate has a backing surface and a facing surface which is substantially free of punch holes, wheel abrasions, embossing and erosion. The acoustical ceiling panel of the invention exhibits an NRC value of about 0.5 or greater and a texture value of about 20 ml/sq ft or greater. In an alternative embodiment, the acoustical panel can be composed of a substrate and the aforementioned coated scrim.

The present invention further provides a suspended ceiling system having a grid, a plurality of acoustical panels and at least one coated scrim, the plurality of acoustical panels and the at least one coated scrim are supported by the grid. The coated scrim and the plurality of acoustical panels exhibit a similar surface texture which provides a monolithic appearance for the system. The suspended ceiling system may further include a flat panel sound radiator positioned above the coated scrim.

DETAILED DESCRIPTION

The present invention is described in further detail below and is shown in the accompanying drawings wherein like numerals refer to like parts throughout the several views.

The coating composition of the invention includes filler particles, a binder and a liquid carrier. The filler particles are of sufficient size to impart a textured appearance to a substrate, while tending not to completely plug or seal the openings within the substrate. The filler particles have an average particle size in the range from about 100 to about 600 microns and preferably in the range from about 200 to about 450 microns. The filler particles constitute from about 35% to about 90% by weight of the coating composition on a dry solids basis and are preferably formed of calcium carbonate, dolomite, dolomitic limestone or combinations thereof. The calcium carbonate particles have an average particle size of approximately 450 microns and may be screened through a 30 mesh sieve. One example of a suitable calcium carbonate filler material is Geotex's TXS, produced by Huber Engineering Materials. The dolomite particles generally exhibit an average particle size of approximately 260 microns. One example of suitable dolomite is DF3015 from Specialty Minerals, Inc.

The binders are selected from natural polymers, modified natural polymers, synthetic polymers and combinations thereof. The synthetic polymers are formed from the following monomers: vinyl acetate, vinyl propionate, vinyl butyrate, ethylene, vinyl chloride, vinylidine chloride, vinyl fluoride, vinylidine fluoride, ethyl acrylate, methyl acrylate, propyl acrylate, butyl acrylate, ethyl methacrylate, methyl methacrylate, butyl methacrylate, hydroxyethyl methacrylate, styrene, butadiene, urethane, epoxy, melamine, ester, and combinations thereof. The natural and modified natural polymers are selected from proteins and carbohydrate polymers, such as starch. Where pigment is included in the coating composition, the binder concentration is such that the pigment to binder ratio is in the range from about 5:1 to about 30:1 on a dry solids basis.

The liquid carrier content of the coating composition may be varied so as to result in the concentration of the solids portion being in the range from about 50% to about 85% by weight of the coating composition. Consequently, the liquid carrier content can be in the range from about 15% to about 50% by weight of the coating composition. In one embodiment, the coating composition has a solids concentration in the range from about 70% to about 80% by weight.

The coating composition of the invention generally exhibits a viscosity in the range of about 1100 to about 5000 cps as measured on a Brookfield viscometer at 10 rpm. In one embodiment, the viscosity of the coating composition is such that the suspension is stable and the coating composition exhibits minimal spread when applied to a substrate, such as a scrim or panel.

In addition to fillers, binders and a liquid carrier, the coating may include secondary particles, dispersants, defoamers and thickening agents which impart color, gloss, durability and other desired properties to the coated surface. Generally, the secondary particles have an average particle size in the range from about 0.1 to about 30 microns and can constitute from about 5% to about 55% on a dry solids basis of the coating composition. The secondary particles are selected from titanium dioxide, barium sulfate, clay, mica, dolomite, silica, talc, perlite, gypsum, wollastonite, calcite, aluminum trihydrate, zinc oxide, zinc sulfate, polymers, pigments and combinations thereof. In one example embodiment, the filler particles and secondary particles used in the coating composition are selected from limestone, dolomite, silica and mixtures thereof. In another example embodiment, the coating composition contains filler particles and secondary particles selected from calcium carbonate, titanium dioxide, clay and mixtures thereof.

Additionally, tetrasodium pyrophosphate, such as that available from Ashland Chemical Company, may be used as a dispersing agent. Also, a 30% solution of hydroxyethyl cellulose may be used as a thickener. An example of hydroxyethyl cellulose is Natrosol FPS-HB from Hercules Incorporated.

The coating composition of the present invention can be applied to a substrate using an HVLP (high volume, low pressure) apparatus to provide the desired textured visual appearance and acoustical characteristics to the substrate. The sprayed dispersion pattern of the coating composition using an HVLP spray gun provides the separation necessary to coat the substrate, while not completely clogging the pores within the substrate. Clogging or sealing of the pores of the substrate tends to prevent or reduce significantly the acoustical transparency that is necessary in an acoustical panel or a flat panel sound radiator.

Generally, the coating composition is fed into a pressure tank that is in flow communication with an HVLP spray gun. For example, the pressure tank can be a one-gallon tank supplied by Binks and the HVLP spray gun may be a model Mach 1 SL or Mach 1A from Binks with a 909VT fluid tip and a 905P air tip attached thereto. The fluid tip or fluid nozzle used with the HVLP spray gun has an opening that is sufficiently large to allow the filler particles to pass therethrough without clogging the nozzle or spray gun. The coating is atomized by the spray gun and applied under pressure to the substrate. The HVLP spray gun provides a lower exit velocity to the coating composition than generally is provided by other air atomizing application methods, thereby minimizing bounce-back of the coating from the substrate and tending to generate larger droplets distributed in a more narrowly defined pattern. The HVLP spray apparatus tends to generate a discontinuous finish that exhibits a coarse texture and preserves the desired acoustical characteristics of the substrate.

The coating composition can be applied with the HVLP spray gun to a substrate to form a single coat or layer that is then allowed to dry or is dried under heated conditions. Additional coats or layers of the coating composition can be applied on top of the first coat with a drying step conducted between each application step. A finish coating may be applied over the coating layers containing the larger filler material. Other process steps such as filtering, transfer, drying and handling can be conducted as desired. Also, other features may be included in the application process of the present invention, such as the use of diaphragm pumps, piston pumps, automated paint booths with reciprocating or stationary guns, to provide a coating on a surface.

Variations of the components within the coating composition within the ranges described above, as well as variations in the pressures, flow rates, application rates and nozzle types of the HVLP spray apparatus, can provide variations in the textured appearance of the coated substrate. For example, the coating composition when applied to a substrate can exhibit an appearance that is substantially equivalent to the Dune product line offered by Armstrong World Industries. Other finishes, such as that of the Cirrus product line of Armstrong World Industries, Inc, also can be generated by application of the coating of the present invention.

In addition to exhibiting a desired textured appearance, a substrate, when coated with the coating composition of the invention exhibits desired performance characteristics, such as airflow resistance and hiding power. Airflow resistance is typically determined by the ASTM C522-87 test method. For example, a substrate, such as a scrim, coated with the coating composition of the present invention according to the process described herein, can exhibit an airflow resistance of 900 mks rayls or less. In one embodiment, the airflow resistance is in the range from about 600 mks rayls to about 900 mks rayls. A coated scrim exhibiting this level of airflow resistance will allow sound to pass through the material at a rate acceptable for using the material as an acoustical facing for a flat panel sound radiator.

Figure 1:
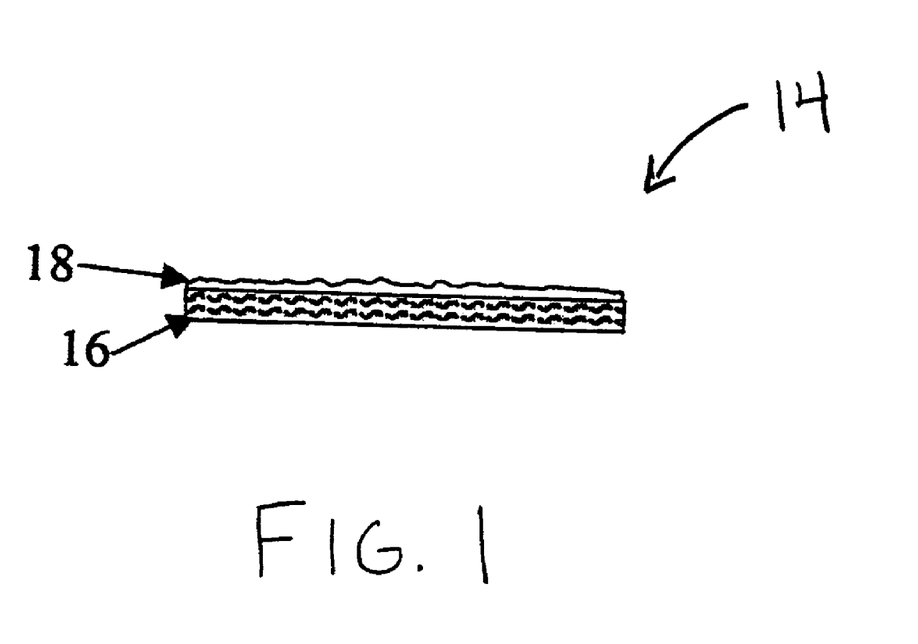
FIG. 1 is a cross-sectional view of a coated scrim in accordance with an exemplary embodiment of the invention.

As shown in FIG. 1, a scrim 16 can be coated with the coating composition 18 of the invention using the HVLP process described herein. The scrim 16 can be formed of woven or non-woven fibers. For example, the scrim 16 can be fiberglass, such as A80EF or YK111 supplied by Owens-Corning. The scrim 16 can also be made of cellulose, polypropylene, polyethylene, glass, polyester, polyamide, and mixtures thereof. An uncoated scrim 16 generally exhibits an airflow resistance value of less than 600 mks rayls, as well as a texture value of 11 ml/sq ft. In contrast, a coated scrim 14 exhibits an airflow resistance value of 900 mks rayls or less and a texture value of about 20 ml/sq ft or greater. In one embodiment, the coated scrim 14 exhibits an airflow resistance in the range from about 600 to 900 ms rayls and a texture value in the range from about 20 ml/sq ft to about 65 ml/sq ft. The texture value can be quantitatively measured using a Texture Volume Test in which the topographic features of the textured are filled and the volume of the material required to fill the spaces between the features is measured as discussed in the examples below.

Generally, the acoustical performance properties of an acoustical panel formed of a porous material, such as mineral fiber, are enhanced by punching holes, wheel abrading, embossing or eroding the facing surface of the board. The typical desired NRC value for a acoustical panel is about 0.50. This is a standard test method in accordance to ASTM Test designation C 423-84a, whereby sound adsorption is measured at various frequencies. However, since conventional coatings are generally not sufficiently acoustically transparent when applied to panel having a thickness of about 0.75 inches or less, one or more of these performance enhancing features must be applied to the panel. Without these performance enhancing features, conventional coated acoustical panels of this thickness generally cannot attain the desired acoustical performance characteristics.

Figure 2:
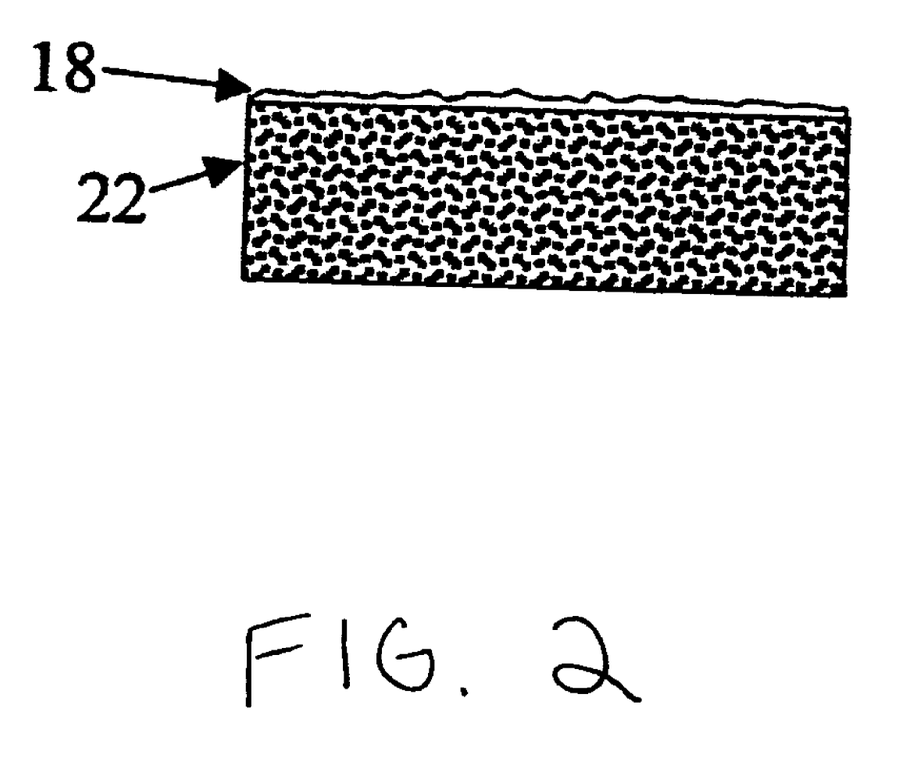
FIG. 2 is a cross-sectional view of a coated acoustical panel in accordance with an exemplary embodiment of the invention.
Figure 3:
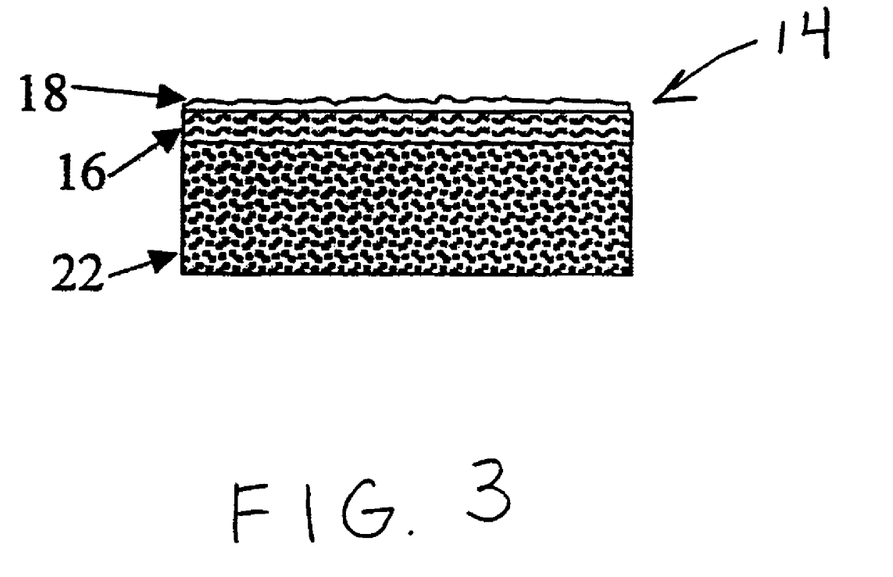
FIG. 3 is a cross-sectional view of a coated acoustical panel, wherein the coated scrim of FIG. 1 is applied to the acoustical panel.

By applying the coating composition 18 of the invention directly to a substrate 22 as shown in FIG. 2 or by combining the coated scrim 14 of FIG. 1 with a substrate 22, as shown in FIG. 3, a panel can be formed which has the desired textured appearance and the acoustical performance properties which allow the panel to absorb a desired amount of ambient noise or sound even when the board has a thickness of about 0.75 inches or less. The substrate 22 can be substantially free of punch holes, wheel abrasions, embossing and erosion. As used herein, the phrase substantially free of punch holes, wheel abrasions, embossing and erosion describes an acoustical panel that has none of these features or has these features in an amount insufficient to beneficially affect the acoustical performance of the acoustical panel. The substrate 22 has a thickness of up to about 0.75 inches. The panel is made of fibers selected from wood, mineral, glass and mixtures thereof and can be coated with a coating composition 18 as described above. Even when the substrate 22 is substantially free of punch holes, wheel abrasions, embossing and erosion, the coated acoustical panel exhibits an NRC value 0.50 or greater, and preferably about 0.65 or greater, and a texture value of 20 ml/sq ft or greater, and preferably 35 ml/sq ft or greater.

The coated scrim 14, can also be used to hide HVAC system components in a suspended ceiling system or serve as the facing of a flat panel sound radiator, such as the flat panel sound radiator described in U.S. Pat. No. 6,386,315, which is hereby incorporated by reference as if fully set forth herein. The coated scrim provides the necessary airflow resistance to allow sound generated by the radiating panel of the flat panel sound radiator to pass through the scrim into the surrounding space. An airflow resistance of 900 mks rayls or less is sufficient to allow sound generated by the sound radiator to enter the surrounding space without adverse effects on the sound quality. In addition, the scrim provides the flat panel sound radiator with the desired textured appearance so that the radiator does not interrupt the monolithic appearance of the suspended ceiling when combined with other acoustical panels within a suspended ceiling system.

Figure 4:
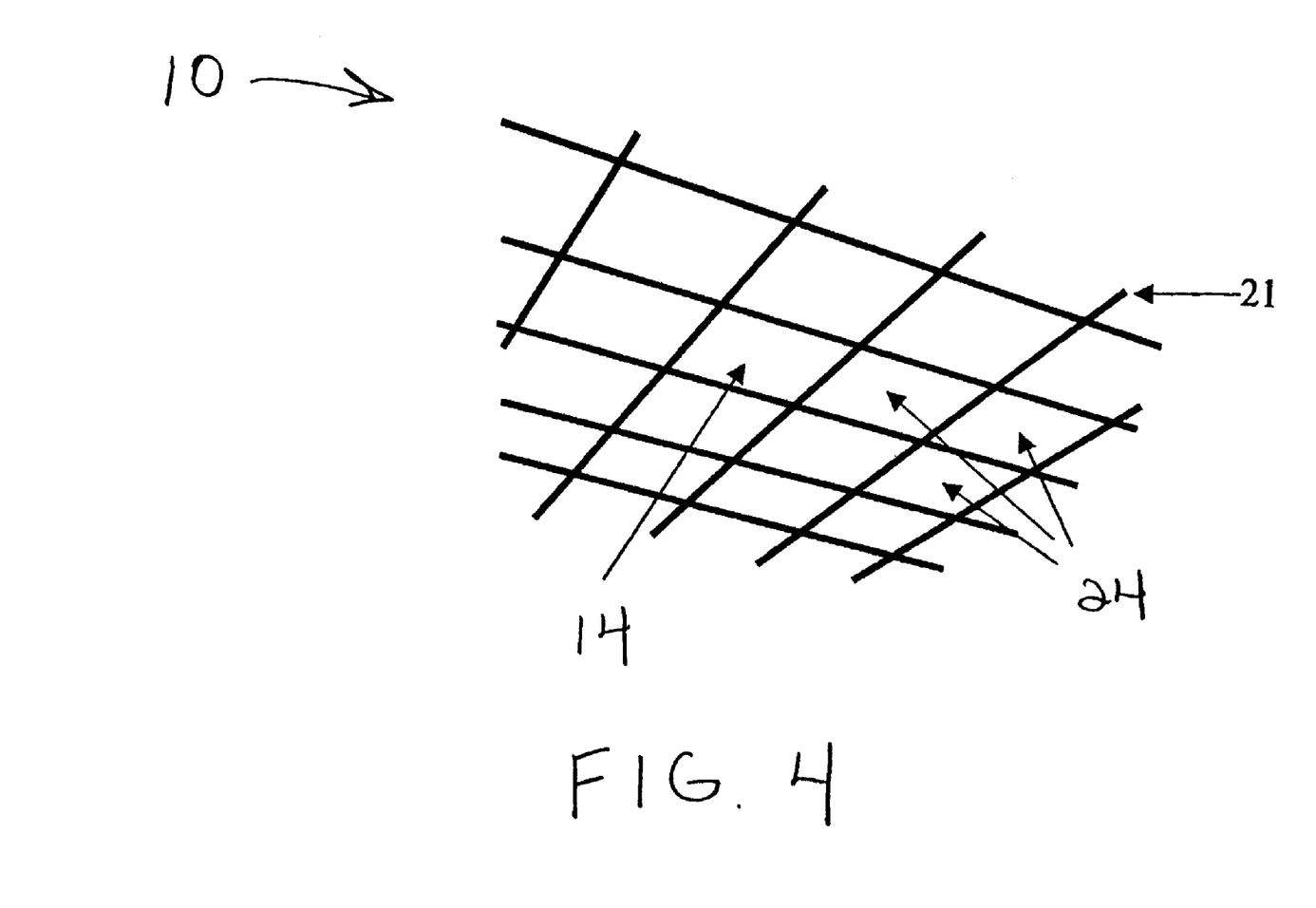
FIG. 4 is a perspective view of a suspended ceiling system which includes the coated scrim of FIG. 1.

As a result, a suspended ceiling system 10, as shown in FIG. 4, can include a plurality of acoustical panels 24 and at least one scrim 14. The panels can be panels which have been subjected to acoustical performance enhancement processes, such as hole punching, wheel abrading, embossing and erosion or those similar to acoustical panel 22, shown in FIGS. 2 and 3, which have not been subject to such processes, but that, nevertheless, exhibit NRC ratings of 0.5 or greater when the coating of the invention is applied to their facing surfaces. The coated scrim 14 and the acoustical panels 24 may be coated with substantially the same coating composition, as that described above, or different coating compositions that, nonetheless, provide the same predetermined texture, resulting in a monolithic appearance for the suspended ceiling system 10. Each of the plurality of acoustical panels 24 and the coated scrim 14 exhibit texture values that are within approximately 24 ml/sq ft of each other, and preferably within approximately 10 ml/sq ft. In one example embodiment, the acoustical panels 24 and the coated scrim 14 exhibit texture values in a range of about 35 ml/sq ft to about 65 ml/sq ft and are within 10 ml/sq ft of each other within this range.

The ingredients for the coatings in the following examples were mixed together to form each coating composition. The coatings were then applied to a panel or scrim surface. The following table shows examples where different coating compositions and spray gun types were used. The resulting acoustical performance and visual appearance of the coated substrates is also provided.

TABLE 1

| Example | 1 | 2 | 3 | 4 | 5 | 6 (1$^{st}$ Coat/ 2$^{nd}$ Coat) | 7 |
|---|---|---|---|---|---|---|---|
| Application Rate (gm/sq ft) | 59 | 64.5 | 61.3 | 63.8 | 60 | 14/52.3 | 60 |
| Formula | | | | | | | |
| Geotex TXS* | | | 72.1% | | | | |
| DF3015 | 59.3% | 84.0% | 12.0% | 84.0% | 84.0% | 80.0%/66.7% | 69.8% |
| Tipure R960 | | 9.3% | 9.2% | 9.3% | 9.3% | 13.3%/26.6% | 23.5% |
| Hydrocarb 60 | 26.4% | | | | | | |
| SpaceRite S-3 | 7.4% | | | | | | |
| Airflex 4530 | 6.4% | 6.2% | 6.2% | 6.2% | 6.2% | 6.2%/6.2% | 6.2% |
| Additives** | 0.5% | 0.5% | 0.5% | 0.5% | 0.5% | 0.5%/0.5% | 0.5% |
| Solids | 74% | 74.6% | 74.6% | 74.6% | 74.6% | 74.7%/74.7% | 74.7% |
| Filler: Binder Ratio | 14.6:1 | 15:1 | 15:1 | 15:1 | 15:1 | 15:1/15:1 | 15:1 |
| Viscosity (cps) | 1400 | 2700 | 3200 | 2700 | 2700 | 3700/2920 | 2300 |
| Spray Gun | | | | | | | |
| Type | Intern. | Extern. | HVLP | HVLP | HVLP | HVLP | HVLP |
| Model | 95 | 95 | Mach1SL | Mach1SL | Mach1SL | Mach1SL | Mach1SL |
| Fluid Tip | 59ASS | 68SS | 909VT | 909VT | 909VT | 909VT | 909VT |
| Air Tip | 244 | 68BP | 905P | 905P | 905P | 905P | 905P |
| Atomization Pressure (psi) | 30 | 20 | 25 | 20 | 10 | 25/25 | 20 |
| Airflow resistance of Coated Substrate (mks rayls) | 985 | 1030 | 700 | 660 | 650 | 691 | 700 |
| Texture (ml/sq ft) | 33 | 48 | 61 | 48 | 47 | 44 | 47 |
| Visual Appearance | Dune | Dune | Dune | Dune | Cirrus | Dune | Dune |

*screened through a 30 mesh sieve
**dispersant, defoamer, thickener

Spacerite S-3 is an aluminum trihydrate that has an average particle size of 1 micron and is available from Alcoa Industrial Chemicals. Hydrocarb 60 is a calcium carbonate product with an average particle size of 2 microns from OMYA, Inc. Tipure R960 is a rutile titanium dioxide product with an average particle size of 0.5 microns from Dupont. Geotex TXS is a calcium carbonate product from Huber screened through a 30 mesh sieve and having an average particle size of 450 microns. DF3015 is dolomitic limestone with an average particle size of 260 microns from Specialty Minerals, Inc. Airflex 4530 is an ethylene vinyl chloride latex from Air Products.

In yet another example, the following ingredients were mixed using a bench-top dispersing mixer to form a coating composition. Other additives, such as dispersants, defoamers, and biocides can be used with this coating composition.

TABLE 2

| Ingredient | Trademark Name | Company | Percentage by Weight (as received basis) |
|---|---|---|---|
| Water | | | 19.96 |
| Titanium Dioxide | Ti-Pure R960 | Dupont | 17.72 |
| Ethylene Vinyl Chloride Latex | Airflex 4530 | Air Products | 9.24 |
| Limestone | DF3015 | Specialty Minerals | 52.00 |
| Hydroxyethyl Cellulose | Natrosol FPS HB | Aqualon | 0.48 |
| Misc. Additives | | | 0.6 |

The viscosity of the coating composition was 2300 cps at a solids content of 76.3% by weight of the total composition. The coating was placed into a 1 gallon Binks Pressure Tank connected to a Binks HVLP spray gun (Model Mach1 SL, 909VT Fluid Tip, 905P air tip). The tank pressure was set to 5 psi and the atomization air pressure was set at 20 psi. The coating was uniformly applied onto an Owens Corning YK111 fiberglass scrim and then dried in a Hotpack oven at 300° F. for 5 minutes. The finished scrim exhibited a airflow resistance of 700 mks rayls. The finished scrim was taped onto a metal frame and then installed in a ceiling surrounded by Armstrong World Industries, Inc. Dune acoustical panels. This finished scrim was substantially visually equivalent to the Armstrong World Industries, Inc. Dune acoustical panels. The texture of the finished scrim was 47 ml/sq. ft. and the texture of the Dune acoustical panels were 41. The finished scrim exhibited a hiding power value of 98.2%.

Texture Volume Test:

Samples of coated and uncoated scrims and fiberboards were evaluated to determine the quantitative texture values of each. Each sample was cut to 12"×12". The scrim samples individually were taped to 12"×12" flat board. The samples individually were placed on a wooden frame made from 1'×1" hardwood with 2 holes drilled into each side to accommodate nails to hold the sample in place. The frame measured 12 1/16"×12 1/16" on its inside dimensions. It is important that the sample fits tightly into the frame. The frame and the sample were flipped so that the sample face was flush with the frame top. Nails were inserted into the holes to hold the sample in place. The frame and the sample were again flipped so that the sample was face up. Glass beads of 40–60 mesh (US Sieve) from Potters Industries Inc., Potsdam, N.Y., were placed on the sample to form a thin layer. The beads were spread using a straight edge to completely fill the texture of the sample. The sample was tapped frequently to settle the beads into the texture. A small brush was used to gently brush away all beads from the edges of the frame. The beads were then transferred to a clean piece of paper by flipping the board and frame. The back of the board was gently tapped to remove all of the beads from the sample. A funnel was used to pour the beads into a graduated cylinder. The cylinder was gently tapped to settle the beads. The volume of the beads was recorded. The results of these tests were as follows:

TABLE 3

| Sample | Volume of Beads (ml/ft$^2$) |
|---|---|
| Uncoated scrim | 11 |
| Uncoated sanded mineral fiberboard (substrate) | 15 |
| Durabrite coated scrim | 7 |
| Dune mineral fiberboard (grit) | 41 |
| Cirrus-type mineral fiberboard (embossed) | 44 |
| Cirrus mineral fiberboard (eroded) | 41 |
| Dune coated scrim | 40 |
| Cirrus coated scrim | 37 |

Excluding fissuring and punching methods, the texture on the face of ceiling panels can range from coarse to very fine. In this test, very coarse textures generally yield very large (>40 ml/sq ft) volumes, while a very fine texture would yield a very low (<20 ml/sq ft/sq ft) volume. The Texture Volume Test can be used to quantify uniformly or substantially smooth textures. The term substantially smooth means that the surface substrate measured defines a plane and at least 50% of the surface is substantially flush with the plane and is substantially free of projections extending from the surface beyond the plane. If this test is not used on "substantially smooth" textured surfaces, e.g. when the texture consists of a few scattered peaks, the test can produce inaccurate and overly large volume values. It should be noted that although the Dune texture is fine and the Cirrus texture is coarse, the quantitative results are similar for the two textures since the open spaces around the textured peaks are measured. Thus, there are a small number of large spaces in Cirrus texture and a large number of small spaces in the Dune texture.

As shown in Table 3, the uncoated scrim, the uncoated sanded mineral fiberboard and the Durabrite coated scrim exhibit texture values that are significantly less than the Dune and Cirrus coated scrims which are textured using grit, embossing, or erosion techniques. However, the scrims coated with the coating of the present invention to produce Dune or Cirrus textured appearances exhibit texture values that are comparable to the conventionally textured fiberboards. Thus, application of the coating composition of the present invention results in textured visuals that are virtually indistinguishable, both quantitatively and visually, from conventionally textured panels. The coating composition can be applied directly to a fiberboard without a scrim to produce similar texture value results.

Tests of mineral fiberboard coated with the coating composition of the invention were also conducted. A prime coat was applied to the miner fiberboard before the textured coating was applied, in order to impart a white color to the board. The NRC value of the prime coated mineral fiberboard was approximated 0.70. The coating composition of the present invention was then applied to the prime coated mineral fiberboard. The resulting fiberboard exhibited an NRC rating of 0.65. The texture of the double coated mineral fiberboard was 39 ml/sq ft and was virtually indistinguishable from conventional Dune panels which have an NRC value of approximately 0.30 and a texture value of approximately 41 ml/sq ft.

Hiding Power:

The hiding power was measured by placing the scrim on an Opacity Test Chart, such as the Opacity Chart Form N2A from the Leneta Company. The Opacity Chart includes both a white section and a black section over which the lightness of the scrim can be measured. Hiding power is determined by dividing the lightness value of the black section by the lightness value of the white section.

It will be understood by those of skill in the art that variations on the embodiments set forth herein are possible and within the scope of the present invention. The embodiments set forth above and many other additions, deletions, and modifications may be made by those of skill in the art without departing from the spirit and scope of the invention.

We claim:

1. A coated scrim comprising:
   a scrim and,
   a coating applied to the scrim, the coating comprising filler particles having an average particle size in a range from about 100 microns to about 600 microns in an amount from about 35% to about 90% by dry solids weight;
   wherein the coated scrim has an airflow resistance in the range from about 600 mks rayls to about 900 mks rayls and a texture value in a range from about 20 ml/sq ft to about 65 ml/sq ft and a hiding power value of about 98% or greater.

2. The coated scrim of claim 1, wherein the filler particles are selected from the group consisting of calcium carbonate, dolomite and mixtures thereof.

3. The coated scrim of claim 1, wherein the coating comprises secondary particles selected from the group consisting of titanium dioxide, barium sulfate, clay, mica, calcium carbonate, limestone, dolomite, silica, talc, perlite, gypsum, wollastonite, calcite, aluminum trihydrate, zinc oxide, zinc sulfate, polymers, pigments and combinations thereof.

4. The coated scrim of claim 3, wherein the secondary particles have an average particle size in the range from about 0.1 to about 30 microns.

5. The coated scrim of claim 3, wherein the coating contains the secondary particles in an amount from about 5% to about 55% by weight on a dry solids basis.

6. The coated scrim of claim 1, wherein the coating further comprises a polymeric binder formed of a monomer selected from the group consisting of vinyl acetate, vinyl propionate, vinyl butyrate, ethylene, vinyl chloride, vinylidene chloride, vinyl fluoride, vinylidine fluoride, ethyl acrylate, methyl acrylate, propyl acrylate, butyl acrylate, ethyl methacrylate, methyl methacrylate, butyl methacrylate, hydroxyethyl methacrylate, styrene, butadiene, urethane, epoxy, melamine, ester and combinations thereof.

7. The coated scrim of claim 6, wherein the coating further comprises a pigment, the coating composition having a pigment to binder ratio in a range from about 5:1 to about 30:1 on a dry solids basis.

8. The coated scrim of claim 1, wherein the filler particles have an average particle size in a range from about 200 to about 450 microns.

9. The coated scrim of claim 1, wherein the coating has a solids content in a range from about 50% to about 85% by weight.

10. The coated scrim of claim 1, wherein the scrim is a fiberglass scrim.

11. The coated scrim of claim 10, wherein the fiberglass scrim is a facing for a flat panel sound radiator.

* * * * *